(12) United States Patent
Mazaika

(10) Patent No.: US 7,531,977 B2
(45) Date of Patent: May 12, 2009

(54) HVAC SYSTEM AND METHOD FOR OVER THE ROAD MOTOR COACHES

(75) Inventor: David M. Mazaika, San Diego, CA (US)

(73) Assignee: ISE Corporation, Poway, CA (US)

( * ) Notice: Subject to any disclaimer, the term of this patent is extended or adjusted under 35 U.S.C. 154(b) by 331 days.

(21) Appl. No.: 11/533,082

(22) Filed: Sep. 19, 2006

(65) Prior Publication Data

US 2008/0067962 A1    Mar. 20, 2008

(51) Int. Cl.
*G05B 5/00* (2006.01)
*H02P 1/00* (2006.01)

(52) U.S. Cl. ................ 318/445; 318/440; 318/441; 318/442; 62/244; 62/262

(58) Field of Classification Search ........... 318/445, 318/466, 440, 441, 442; 296/24.39; 62/244, 62/262
See application file for complete search history.

(56) References Cited

U.S. PATENT DOCUMENTS

| 4,926,655 | A | * | 5/1990 | King | 62/244 |
|---|---|---|---|---|---|
| 5,184,474 | A | * | 2/1993 | Ferdows | 62/244 |
| 5,205,130 | A | * | 4/1993 | Pannell | 62/236 |
| 5,307,645 | A | * | 5/1994 | Pannell | 62/244 |
| 5,568,733 | A | * | 10/1996 | Toyota et al. | 62/228.4 |
| 5,605,055 | A | * | 2/1997 | Salgado | 62/244 |
| 5,632,330 | A | * | 5/1997 | Drucker et al. | 165/151 |
| 5,878,584 | A | * | 3/1999 | Sasaki et al. | 62/115 |
| 5,909,061 | A | * | 6/1999 | Sasaki et al. | 307/44 |
| 5,916,253 | A | * | 6/1999 | Amr et al. | 62/259.1 |
| 6,282,912 | B1 | * | 9/2001 | Mannerheim | 62/244 |
| 6,295,826 | B1 | * | 10/2001 | Lee | 62/244 |
| 6,301,914 | B1 | * | 10/2001 | Oliva et al. | 62/262 |
| 6,357,249 | B1 | * | 3/2002 | Robinson et al. | 62/285 |
| 6,925,826 | B2 | * | 8/2005 | Hille et al. | 62/244 |
| 2003/0029184 | A1 | * | 2/2003 | Ohama et al. | 62/262 |
| 2004/0168461 | A1 | * | 9/2004 | Park et al. | 62/262 |
| 2004/0221596 | A1 | * | 11/2004 | Hille et al. | 62/244 |
| 2006/0103154 | A1 | * | 5/2006 | Berry | 296/24.39 |
| 2007/0295017 | A1 | * | 12/2007 | Pannell | 62/236 |

\* cited by examiner

*Primary Examiner*—Paul Ip
(74) *Attorney, Agent, or Firm*—Stephen C. Beuerle; Procopio Cory Hargreaves & Savitch LLP

(57) ABSTRACT

A method of using an externally powered HVAC system for an over-the-road motor coach includes coupling the HVAC system to an external shore power source at a temporary stop location for the over-the-road motor coach while the over-the-road motor coach is parked and vehicle engine is turned off; receiving electrical power from the electrical outlet to power the HVAC system; and using the HVAC system to circulate refrigerant for heating or cooling an interior cabin of the over-the-road motor coach and power HVAC fans to ventilate the interior cabin of the over-the-road motor coach.

7 Claims, 2 Drawing Sheets

HVAC SYSTEM AND METHOD FOR OVER THE ROAD MOTOR COACHES

FIELD OF THE INVENTION

The field of the invention relates to heating, ventilation, and air-conditioning (HVAC) systems for over-the-road motor coaches such as tour buses.

BACKGROUND OF THE INVENTION

A typical tour bus is a 40 foot long, 40,000 lbs GVWR over-the-road motor coach configured with one front door and row seating for about 50 people. The motor coach industry in the U.S. has approximately 44,000 buses and consumes almost 500 million gallons of fuel per year. The current practice is that while these buses are parked at loading or unloading terminals and in route stop-overs the HVAC for the driver and passengers is supplied by power-take-offs (PTOs) from the engine and, thus, require the engine to be running. However, it is undesirable to keep the engine of the vehicle running while it is parked for a variety of reasons such as, but not limited to, noise, exhaust emissions, fuel consumption, efficiency, wear and tear on the engine, and anti-idling laws.

SUMMARY OF THE INVENTION

Accordingly, an aspect of the present invention involves a system and method to provide heating, ventilation, and air conditioning (or, at least air conditioning (AC)) to an over-the-road motor coach from external power (e.g., shore power) while the tour bus is parked with the engine off. The system and method uses 230 volt AC three phase power, which is commonly available off-board, external to the bus, at bus terminal facilities, to power an on-board AC refrigerant compressor and ventilating fans.

Another aspect of the invention involves a method of using an externally powered HVAC system for an over-the-road motor coach. The method includes coupling the HVAC system to an external shore power source at a temporary stop location for the over-the-road motor coach while the over-the-road motor coach is parked and vehicle engine is turned off; receiving electrical power from the electrical outlet to power the HVAC system; and using the HVAC system to circulate refrigerant for heating or cooling an interior cabin of the over-the-road motor coach and power HVAC fans to ventilate the interior cabin of the over-the-road motor coach.

BRIEF DESCRIPTION OF THE DRAWINGS

The accompanying drawings, which are incorporated in and form a part of this specification, illustrate embodiments of the invention and together with the description, serve to explain the principles of this invention.

DETAILED DESCRIPTION OF A PREFERRED EMBODIMENT

Figure 1:
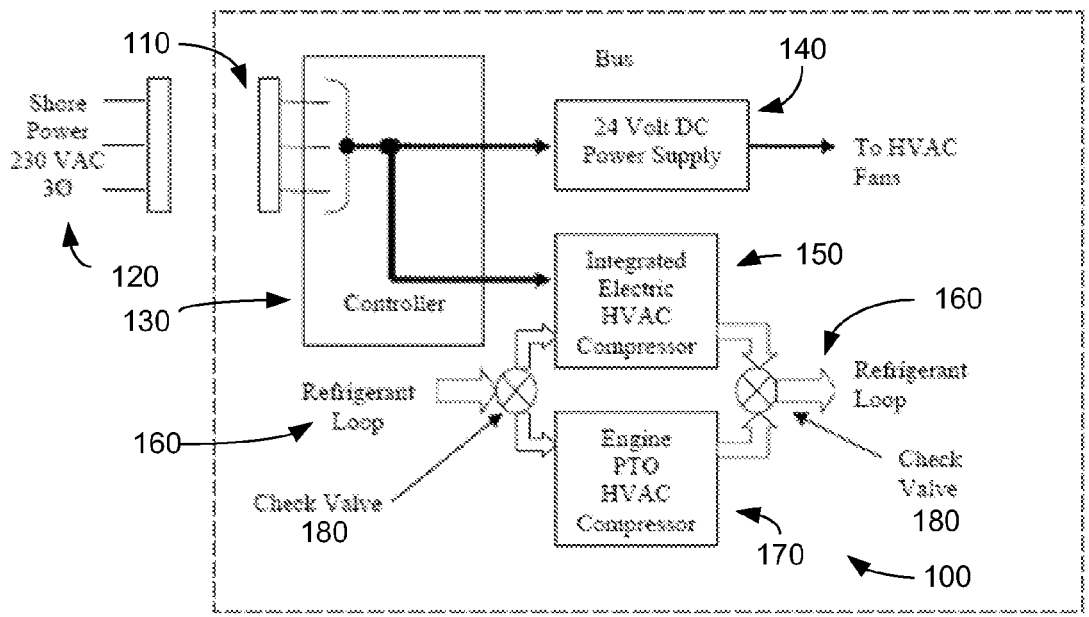
FIG. 1 is a schematic of an embodiment of an externally powered HVAC system for an over-the-road motor coach that receives external power while the over-the-road motor coach is parked with the engine off to run the HVAC system.

With reference to FIG. 1, an embodiment will be described of an externally powered HVAC system 100 for an over-the-road motor coach that receives external power while the over-the-road motor coach is parked with the engine off to run the HVAC system 100. Although the system 100 is described as a heating, ventilation, and air-conditioning (HVAC) system 100, in alternative embodiments, the system 100 provides one or more of heating, ventilation, and air-conditioning.

As used herein, an over-the-road motor coach is defined as a bus at least 30 feet long, at least 20,000 lbs. GVW, with row seating for at least 20 people, having approximately 380-435 horsepower, a top speed of at least 70 mph, and a typical range between fuel stops of 700 miles. A typical tour bus is a 40 foot long, 40,000 lbs GVWR over-the-road motor coach configured with one front door and row seating for about 50 people.

The HVAC system 100 in FIG. 1 includes a connector 110 for coupling with an external shore power 230 volt AC three phase power source 120, which is commonly available off-board, external to the over-the-road motor coach, at bus terminal facilities, to power the HVAC system 100. In an implementation of the HVAC system 100, the connector 110 is an the off-board plug connection adapted to mate with a receptacle at the 230 volt AC three phase power source 120. The HVAC system 100 includes a controller 130 to control power flow to a 24 Volt DC Power Supply 140 and an integrated electric HVAC compressor 150. The 24 Volt DC Power Supply 140 provides an estimated 160 amps of electrical current for the ventilating fans. In an alternative embodiment the 24 Volt DC Power Supply 140 provides sufficient electrical current to power all of the electrical loads of the entire motor coach through the 24 Volt power distribution system of the motor coach while parked with the engine off without requiring a negative drain on the batteries. This alternative eliminates the requirement for having separate 24 Volt DC switching and controls for powering only the HVAC fans. The integrated electric HVAC compressor 150 includes a compressor and a motor. The integrated electric HVAC compressor 150 is connected into the vehicle's refrigerant loop 160 in parallel with the vehicle's engine PTO compressor 170. The parallel connection includes pressure check valves 180 such that either compressor 150, 170 can circulate the refrigerant around the refrigerant loop 160.

In use, when the over-the-road motor coach is parked at loading or unloading bus terminals or in route stop-overs with the engine off, the integrated electric HVAC compressor 150 of the HVAC system 100 receives off-board, external power from the 230 volt AC three phase power source 120 via the connector 110 and the controller 130. The integrated electric HVAC compressor 150 circulates refrigerant through the refrigerant loop 160 for heating or cooling of the interior vehicle cabin. The 24 Volt DC Power Supply 140 receives off-board, external power from the 230 volt AC three phase power source 120 via the connector 110 and the controller 130 and provides an estimated 160 amps of electrical current for powering the ventilating fans to provide ventilation. In an alternative embodiment the 24 Volt DC Power Supply 140 provides more than 160 amps of electrical current to power all of the electrical loads of the entire motor coach through the 24

Volt power distribution system of the motor coach while parked with the engine off without requiring a negative drain on the batteries. This alternative eliminates the requirement for having separate 24 Volt DC switching and controls for powering only the HVAC fans. When the connector 110 is uncoupled from the 230 volt AC three phase power source 120 and the engine of the vehicle is turned on, the HVAC system 100 operates in a traditional manner, where is it powered by power-take-offs (PTOs) from the vehicle engine.

Figure 2:
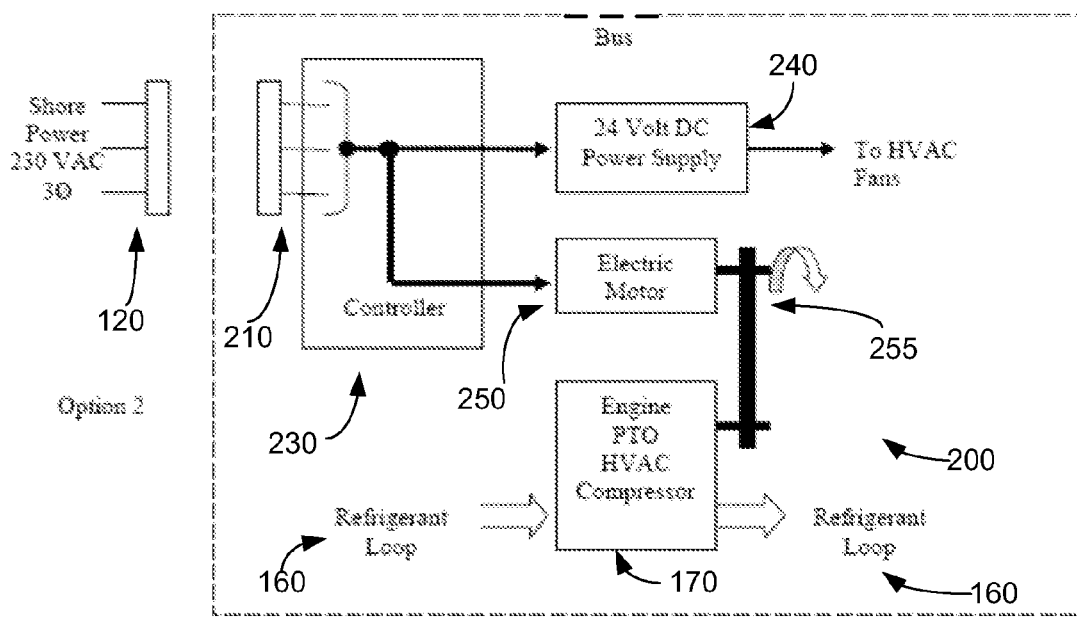
FIG. 2 is a schematic of another embodiment of an externally powered HVAC system for an over-the-road motor coach that receives external power while the over-the-road motor coach is parked with the engine off to run the HVAC system.

With reference to FIG. 2, another embodiment will be described of an externally powered HVAC system 200 for an over-the-road motor coach that receives external power while the over-the-road motor coach is parked with the engine off to run the HVAC system.

Figure 3:
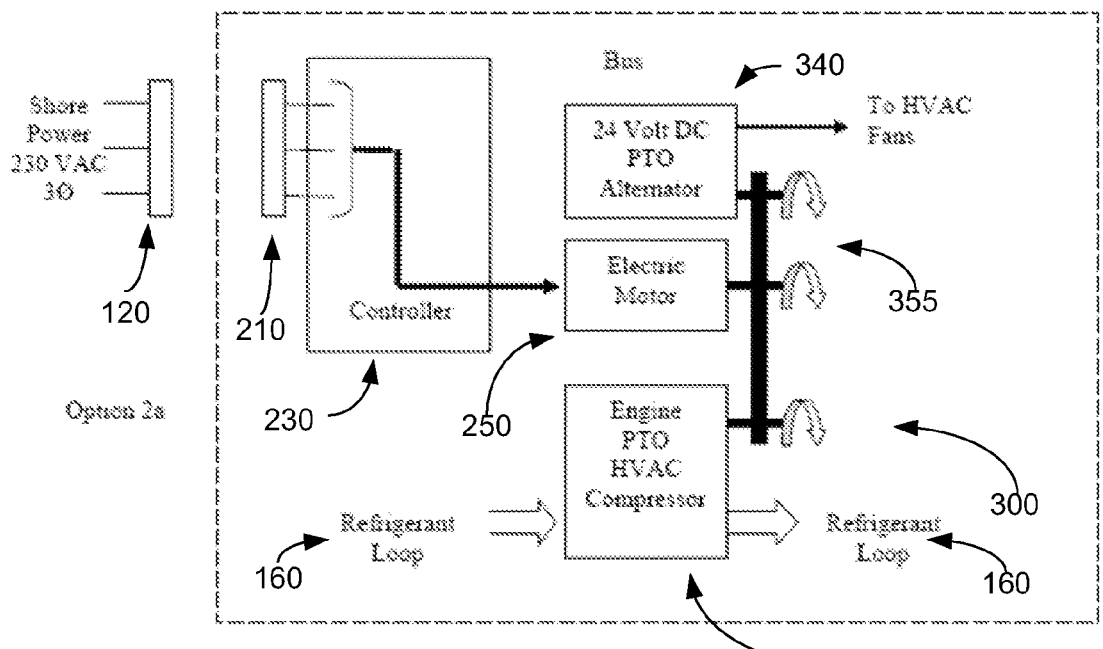
FIG. 3 is a schematic of a further embodiment of an externally powered HVAC system for an over-the-road motor coach that receives external power while the over-the-road motor coach is parked with the engine off to run the HVAC system.

The HVAC system 200 in FIG. 2 includes a connector 210 for coupling with the external shore power 230 volt AC three phase power source 120. The HVAC system 200 includes a controller 230 to control power flow to a 24 Volt DC Power Supply 240 and an electric motor 250. The 24 Volt DC Power Supply 240 provides an estimated 160 amps of electrical current for the ventilating fans. In an alternative embodiment the 24 Volt DC Power Supply 140 provides more than 160 amps of electrical current to power all of the electrical loads of the entire motor coach through the 24 Volt power distribution system of the motor coach while parked with the engine off without requiring a negative drain on the batteries. This alternative eliminates the requirement for having separate 24 Volt DC switching and controls for powering only the HVAC fans. The electric motor 250 is a separate, added-on 230 VAC 3-phase electric motor. The HVAC system 200 includes a modified belt-driven clutch 255 on engine PTO HVAC compressor 270 such that the compressor 270 is driven by the separate, added-on 230 VAC 3-phase electric motor 250 without the engine running. FIG. 3 shows an alternative embodiment of a HVAC system 300 that is similar to the HVAC system 200 of FIG. 2, but the 24 VDC power supply 240 is eliminated, and instead engine PTO 24 VDC alternator 330 is also driven (through modified belt-driven clutch 355) by the same electric motor 250 used to drive the PTO AC compressor 170.

In use, when the over-the-road motor coach is parked at loading or unloading bus terminals or in route stop-overs with the engine off, the separate, added-on 230 VAC 3-phase electric motor 250 of the HVAC system 200, 300 receives off-board, external power from the 230 volt AC three phase power source 120 via the connector 210 and the controller 230. Through the modified belt-driven clutch 255, the electric motor 230 drives the engine PTO AC compressor 270 without the engine running to circulate refrigerant through the refrigerant loop 160 for heating or cooling of the interior vehicle cabin. The 24 Volt DC Power Supply 240 receives off-board, external power from the 230 volt AC three phase power source 120 via the connector 210 and the controller 230 and provides an estimated 160 amps of electrical current for powering the ventilating fans to provide ventilation. In an alternative embodiment the 24 Volt DC Power Supply 140 provides more than 160 amps of electrical current to power all of the electrical loads of the entire motor coach through the 24 Volt power distribution system of the motor coach while parked with the engine off without requiring a negative drain on the batteries. This alternative eliminates the requirement for having separate 24 Volt DC switching and controls for powering only the HVAC fans. In the embodiment of FIG. 3, the electric motor 230 also drives the PTO 24 VDC alternator 330 to power the ventilating fans to provide ventilation. When the connector 210 is uncoupled from the 230 volt AC three phase power source 120 and the engine of the vehicle is turned on, the HVAC system 200, 300 operates in a traditional manner, where is it powered by power-take-offs (PTOs) from the vehicle engine.

Figure 4:
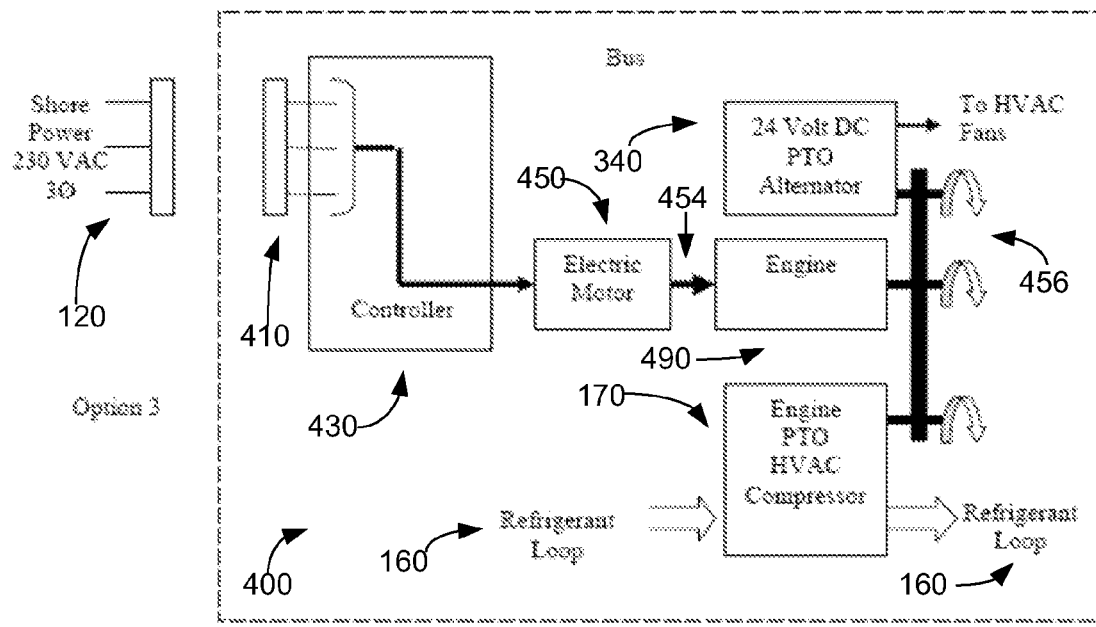
FIG. 4 is a schematic of a still further embodiment of an externally powered HVAC system for an over-the-road motor coach that receives external power while the over-the-road motor coach is parked with the engine off to run the HVAC system.

With reference to FIG. 4, another embodiment will be described of an externally powered HVAC system 400 for an over-the-road motor coach that receives external power while the over-the-road motor coach is parked with the engine off to run the HVAC system 400.

The HVAC system 400 in FIG. 4 includes a connector 410 for coupling with the external shore power 230 volt AC three phase power source 120. The HVAC system 400 includes a controller 430 to control power flow to an electric motor 450. The electric motor 450 is a separate, added-on a 20 kW to 30 kW 230 VAC 3-phase electric motor. A cog belt drive 454 or PTO gear drive 456 is operably coupled to the electric motor 450 and vehicle engine 490 to spin the engine 490 with the engine fuel supply cut off. In this option, the HVAC fans and refrigeration system are operated in a traditional manner from the spinning engine 490 which is driven by the electric motor 450 from the 230 VAC 3 phase electric power 120.

In use, when the over-the-road motor coach is parked at loading or unloading bus terminals or in route stop-overs with the engine off, the separate, added-on a 20 kW to 30 kW 230 VAC 3-phase electric motor 450 of the HVAC system 400 receives off-board, external power from the 230 volt AC three phase power source 120 via the connector 410 and the controller 430. Through the cog belt drive 454 or PTO gear drive 456, the electric motor 430 spins the engine 490 with the engine fuel supply cut off and without the engine running. This causes the HVAC fans and refrigeration system to be operated in a traditional manner from the spinning engine 490.

The embodiments of the HVAC system 100, 200, 300, 400 described above provide systems and methods to provide heating, ventilation, and/or air conditioning to an over-the-road motor coach from external power while the tour bus is parked with the engine off. The systems and methods use 230 volt AC three phase power, which is commonly available off-board, external to the bus, at bus terminal facilities, to power an on-board AC refrigerant compressor and ventilating fans. This eliminates the noise, exhaust emissions, fuel consumption, efficiency, wear and tear on the engine, and anti-idling law violation problems caused by running the engine in parked over-the-road motor coach vehicles.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method of using an externally powered HVAC system for an over-the-road motor coach, comprising:

coupling the HVAC system to an external shore power source at a temporary stop location for the over-the-road motor coach while the over-the-road motor coach is parked and vehicle engine is turned off;

receiving electrical power from the electrical outlet to power the HVAC system;

using the HVAC system to circulate refrigerant for heating or cooling an interior cabin of the over-the-road motor coach and power HVAC fans to ventilate the interior cabin of the over-the-road motor coach, wherein using the HVAC system includes powering an electric motor and driving an engine with the electric motor with fuel supply shut off to the engine, and the engine driving a PTO HVAC compressor and a PTO alternator.

2. The method of claim 1, wherein the external shore power source is an external shore power 230 volt AC three phase power source.

3. The method of claim 1, wherein using the HVAC system to power HVAC fans includes receiving power at a 24 Volt DC power supply and supplying power from the 24 Volt DC power supply power to the HVAC fans to ventilate the interior cabin of the over-the-road motor coach.

4. The method of claim 3, wherein the 24 Volt DC power supply supplies power to the HVAC fans and the rest of the 24 Volt DC loads of the motor coach through the 24 Volt DC distribution system of the motor coach.

5. The method of claim 1, wherein the electric motor is a separate, added-on 230 VAC 3-phase electric motor.

6. The method of claim 1, wherein the electric motor drives the engine through a cog belt drive.

7. The method of claim 1, wherein the electric motor drives the engine through a PTO gear drive.

* * * * *